(12) United States Patent
Gleason et al.

(10) Patent No.: US 7,832,769 B2
(45) Date of Patent: Nov. 16, 2010

(54) GUIDE FOR SEATBELT WEBBING

(75) Inventors: Michael P. Gleason, Chesterfield, MI (US); Jeffery Rosso, Imlay City, MI (US); Devin Rewalt, Richmond, MI (US)

(73) Assignee: TRW Vehicle Safety Systems, Inc., Washington, MI (US)

(*) Notice: Subject to any disclaimer, the term of this patent is extended or adjusted under 35 U.S.C. 154(b) by 685 days.

(21) Appl. No.: 11/518,638

(22) Filed: Sep. 11, 2006

(65) Prior Publication Data
US 2008/0061544 A1 Mar. 13, 2008

(51) Int. Cl.
B60R 22/18 (2006.01)
B60R 22/24 (2006.01)
B60R 22/00 (2006.01)

(52) U.S. Cl. .................................. 280/808; 280/801.1
(58) Field of Classification Search ................. 280/808, 280/801.1; 297/468, 483, 486
See application file for complete search history.

(56) References Cited

U.S. PATENT DOCUMENTS

| | | | | |
|---|---|---|---|---|
| 4,005,904 | A * | 2/1977 | Weman et al. | 297/483 |
| 4,142,274 | A * | 3/1979 | Scholz et al. | 24/163 R |
| 4,318,552 | A * | 3/1982 | Seifert et al. | 280/801.1 |
| 4,480,853 | A * | 11/1984 | Ando et al. | 280/801.1 |
| 4,618,165 | A | 10/1986 | Seifert et al. | |
| 5,037,135 | A * | 8/1991 | Kotikovsky et al. | 280/808 |
| 6,123,391 | A * | 9/2000 | Boelstler et al. | 297/464 |
| 6,168,206 | B1 * | 1/2001 | Greib et al. | 280/808 |
| 6,533,322 | B2 * | 3/2003 | Janz | 280/808 |
| 6,641,222 | B2 * | 11/2003 | Specht | 297/483 |
| 6,739,625 | B2 | 5/2004 | Tomita et al. | |
| 7,325,835 | B2 * | 2/2008 | Janz | 280/801.1 |

FOREIGN PATENT DOCUMENTS

| | | | |
|---|---|---|---|
| JP | 544719 | | 6/1993 |
| JP | 2004-122894 | A * | 4/2004 |
| WO | 2004031004 | | 4/2004 |
| WO | 2004080768 | | 9/2004 |

OTHER PUBLICATIONS

Photo disclosing a seat belt deflection fitting with angled grooves with explanation.

* cited by examiner

Primary Examiner—Ruth Ilan
(74) Attorney, Agent, or Firm—Tarolli, Sundheim, Covell & Tummino LLP

(57) ABSTRACT

A one-piece stamped metal guide (128) for seatbelt webbing (112) in a vehicle (108) includes a mounting portion (242) for mounting the guide in the vehicle. The mounting portion (242) defines a mounting plane (352). A guiding portion (244) includes a guiding surface (256) having at least one guide element (258) stamped in the metal forming the guiding portion. A portion of the guiding surface (256) including the at least one guide element (258) is positioned outside the mounting plane (352). Laterally spaced side portions (246) connect the guiding portion (244) with the mounting portion (242). The mounting portion (242), guiding portion (244), and side portions (246) define a webbing slot (248) for receiving the seatbelt webbing (112) for sliding movement over the guiding surface (256).

21 Claims, 9 Drawing Sheets

GUIDE FOR SEATBELT WEBBING

TECHNICAL FIELD

The present invention relates to a guide for seatbelt webbing. More particularly, the present invention relates to a seatbelt webbing guide having a stamped anti-dumping feature.

BACKGROUND OF THE INVENTION

A three-point seatbelt system typically includes a guide or D-ring that is mounted to a structure of the vehicle. Seatbelt webbing of the three-point seatbelt system extends from a retractor and through a webbing slot of the D-ring. The seatbelt webbing slides on a guide surface of the D-ring as it passes through the webbing slot.

Tension in the seatbelt webbing applies a load to the D-ring. The D-ring transfers the load to the structure of the vehicle. For example, during a frontal vehicle crash condition in which an occupant of a seat is restrained by the seatbelt system, the retractor of the seatbelt system locks to prevent withdrawal of the seatbelt webbing. Due to inertia, the occupant tends to move forward relative to the seat. The forward movement of the occupant tensions the seatbelt webbing. The tensioned seatbelt webbing applies a load to the D-ring. The D-ring transfers the load to the structure of the vehicle.

The direction and magnitude of the load applied to the D-ring varies depending upon a variety of factors, such as crash conditions (e.g., speed and impact angle), the size of the occupant, and the location of the D-ring relative to the seat. Since the load may be applied to the D-ring in various directions, the D-ring may be pivotable relative to the structure of the vehicle. The pivoting movement of the D-ring helps maintain a position of the seatbelt webbing relative to the guide surface of the D-ring.

Seatbelt webbing, when viewed in section, preferably extends flat across the surface of the D-ring upon which it slides. When extending flat across the surface, the seatbelt webbing is evenly loaded across its width and distributes the load evenly along the surface of the D-ring. Seatbelt webbing passing through a D-ring may, however, experience a phenomenon known as "dumping." Dumping is the bunching together of the seatbelt webbing at one end of the webbing slot. When dumping occurs, the seatbelt webbing may be loaded unevenly. The dumped seatbelt webbing concentrates the load on a particular portion of the D-ring.

The tendency of the seatbelt webbing to dump increases as the load exerted by the webbing on the D-ring increases. Therefore, it may be desirable to provide a D-ring designed to help prevent dumping.

SUMMARY OF THE INVENTION

The present invention relates to a one-piece stamped metal guide for seatbelt webbing in a vehicle. The guide includes a mounting portion for mounting the guide in the vehicle. The mounting portion defines a mounting plane. A guiding portion includes a guiding surface having a guide element stamped in the metal forming the guiding portion. A portion of the guiding surface including the guide element is positioned outside the mounting plane. Laterally spaced side portions connect the guiding portion with the mounting portion. The mounting portion, guiding portion, and side portions define a webbing slot for receiving the seatbelt webbing for sliding movement over the guiding surface.

The present invention also relates to an apparatus for helping to protect an occupant of seat in a vehicle. The apparatus includes a length of seatbelt webbing having a first end portion and an opposite second end portion. An anchor secures the first end portion of the seatbelt webbing to the vehicle. A retractor secures the second end portion of the seatbelt webbing to the vehicle. A stamped metal guide is secured to the vehicle and defines a webbing slot through which the seatbelt webbing extends. A tongue assembly is secured to the seatbelt webbing between the first and second end portions. A buckle assembly is secured to the vehicle and receives the tongue assembly. The guide includes a mounting portion for mounting the guide to the vehicle. The mounting portion defines a mounting plane. A guiding portion includes a guiding surface including a guide element stamped in the metal forming the guiding portion. A portion of the guiding surface including the guide element is positioned outside the mounting plane. Laterally spaced side portions connect the guiding portion with the mounting portion. The mounting portion, guiding portion, and side portions define a webbing slot for receiving the seatbelt webbing for sliding movement over the guiding surface.

The present invention further relates to a method of making a guide for seatbelt webbing in a vehicle. The method includes the step of providing a guide having a mounting portion, a guiding portion, and laterally spaced side portions connecting the guiding portion with the mounting portion. The mounting portion defines a mounting plane and the guiding portion includes a guiding surface. The method also includes the step of stamping the guide to form a bend that positions at least a portion of the guiding surface outside the mounting plane. The method further includes the step of moving a stamping die substantially parallel to the mounting plane into contact with the guiding surface to stamp a guide element on the portion of the guiding surface positioned outside the mounting plane.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIGS. 9A-9E illustrate constructions of a portion of the apparatus Of FIG. 1.

DESCRIPTION OF EMBODIMENTS

Figure 1:
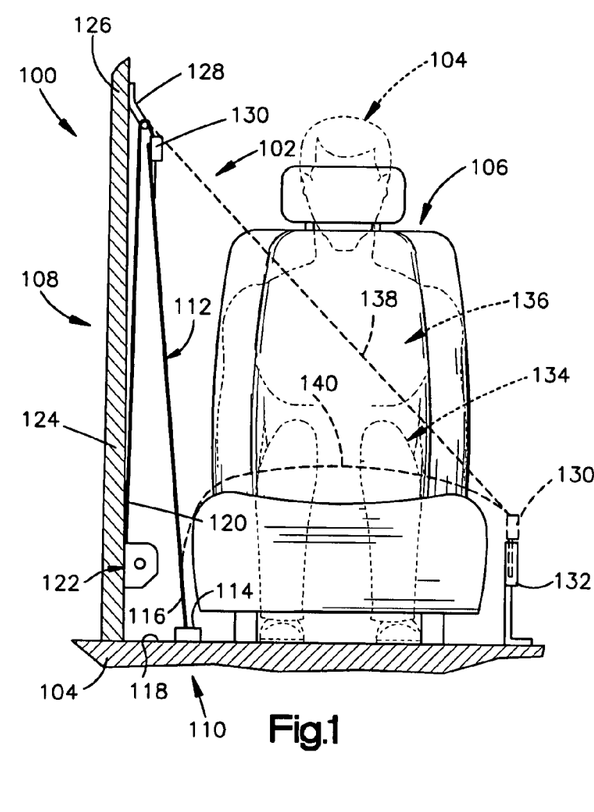
FIG. 1 is a front view of an apparatus for helping to protect an occupant of a vehicle, according to a first embodiment of the present invention.

The present invention relates to an apparatus for helping to protect an occupant of a vehicle. Referring to FIG. 1, the apparatus 100 includes a three-point continuous loop seatbelt system 102 for helping to protect an occupant 104 of a seat 106 in a vehicle 108. The embodiment illustrated in FIG. 1 depicts the seatbelt system 102 installed on a passenger side 110 of the vehicle 108. Those skilled in the art, however, will appreciate that the seatbelt system 102 could be installed on a driver side (not shown) of the vehicle 108.

The seatbelt system 102 includes a length of seatbelt webbing 112. An anchor 114 fixes a first end portion 116 of the seatbelt webbing 112 to vehicle structure, such as a floorpan 118, on an outboard side of the seat 106. A second end portion 120 of the seatbelt webbing 112 is fixed to a retractor 122. In the embodiment of FIG. 1, the retractor 122 is secured at a suitable location on a side structure 124 of the vehicle 108, such as on a B-pillar 126. The retractor 122 could, however, be secured to any suitable vehicle structure, such as the floorpan 118.

The seatbelt system 102 also includes a guide 128 constructed in accordance with the present invention. The guide 128 illustrated in FIG. 1 may comprise what is referred to in the art as a "D-ring" assembly. The guide or D-ring 128 is secured to the B-pillar 126 in a location spaced above the retractor 122 and adjacent or above an upper extent of the vehicle seat 106 (not including the head rest).

The seatbelt webbing 112 extends upward from the retractor 122, through the guide 128, and downward from the guide 128 to the anchor 114. A tongue assembly 130 is located on the seatbelt webbing 112 between the guide 128 and the anchor 114. The tongue assembly 130 is slidable or otherwise movable along the seatbelt webbing 112. The seatbelt system 102 also includes a buckle assembly 132. The buckle assembly 132 is anchored to vehicle structure, such as the floorpan 118, on the inboard side of the vehicle seat 106.

When the seatbelt system 102 is not in use, the seatbelt webbing 112 extends generally vertically in the vehicle 108 and is positioned on the outboard side of the seat 106, as shown in FIG. 1 by solid lines. To use the seatbelt system 102, the tongue assembly 130 is grasped manually and is pulled across the occupant 104 of the seat 106. As the tongue assembly 130 is pulled across the occupant 104, the tongue assembly slides or moves along the seatbelt webbing 112, and seatbelt webbing is withdrawn from the retractor 122. The movement of the tongue assembly 130 across the occupant 104 pulls the seatbelt webbing 112 across the lap 134 and torso 136 of the occupant. The tongue assembly 130 is then inserted into the buckle assembly 132 and is latched in the buckle assembly. When the tongue assembly 130 is latched in the buckle assembly 132, the seatbelt webbing 112 is in the position shown in FIG. 1 by dashed lines.

When the tongue assembly 130 is latched in the buckle assembly 132, the tongue assembly divides the seatbelt webbing 112 into a torso portion 138 and a lap portion 140. The torso portion 138 of the seatbelt webbing 112 extends between the guide 128 and the tongue assembly 130 and extends across the torso 136 of the occupant 104 of the seat 106. The lap portion 140 of the seatbelt webbing 112 extends between the tongue assembly 130 and the anchor 114 and extends across the lap 134 of the occupant 104 of the seat 106.

Figure 2:
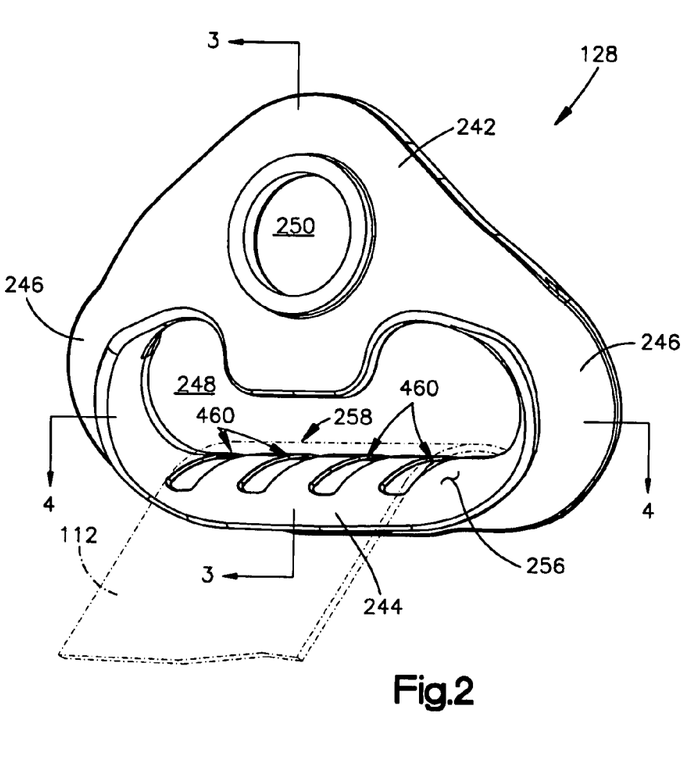
FIG. 2 is a perspective view of a portion of the apparatus of FIG. 1.

Referring to FIG. 2, the guide 128 has a one-piece stamped metal construction in which the guide is stamped from a single homogeneous piece of metal material, such as steel. One suitable metal material is a high strength, low alloy steel with good formability characteristics. One particular high strength, low alloy steel with good formability characteristics is cold rolled steel having the following chemistry and mechanical properties:

Chemistry
Carbon—0.13% maximum
Manganese—1.65% maximum
Phosphorus—0.03% maximum
Sulfur—0.03% maximum
Aluminum—0.015% minimum
Silicon—0.50% maximum
Total Niobium, Titanium, and Vanadium—0.005% minimum
Iron—balance Mechanical Properties
Yield Strength (minimum)—65,000 psi per ASTM E8/E8M
Ultimate Tensile Strength—72-80,000 psi per ASTME8/E8M
Elongation*—15% minimum per ASTM E8/E8M
Bend Test**—180 degrees per ASTM E290
*Two inch gage length.
**A round mandrel with a diameter equal to the thickness of the steel, regardless of grain direction, with burr removal.

The guide 128 includes a mounting portion 242, a guiding portion 244, and laterally spaced side portions 246 (two shown) that connect the guiding portion with the mounting portion. The guiding portion 244, mounting portion 242, and side portions 246 collectively help define a webbing slot 248 through which the seatbelt webbing 112 extends.

Figure 3:
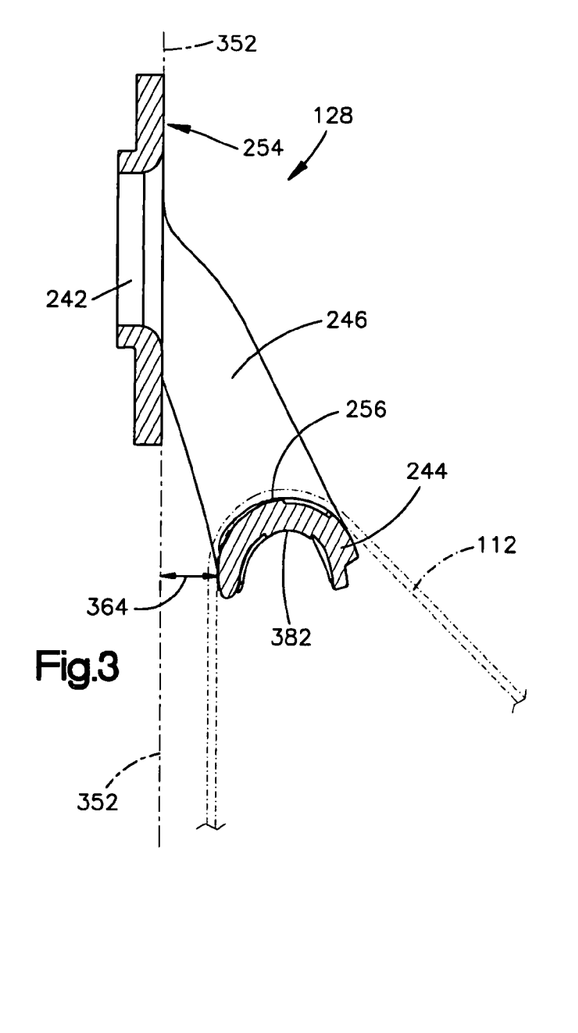
FIG. 3 is a sectional view taken generally along line 3-3 of FIG. 2.

The mounting portion 242 is adapted for mounting the guide 128 to the vehicle in a known manner, such as through a pivotal connection facilitated via a mounting hole 250. As shown in FIG. 3, the mounting portion 242 defines a mounting plane 352. The mounting plane 352 extends along and coincides with a front surface or face 254 of the mounting portion 242.

Referring to FIGS. 2 and 3, the guiding portion 244 includes a guiding surface 256 over which the seatbelt webbing 112 slides during operation of the seatbelt system 102. The guiding surface 256 includes one or more guide elements 258 that help prevent dumping during seatbelt loading. Embodiments of the guiding surface 256 are shown in more detail in FIGS. 4A-4D. Those skilled in the art will appreciate that the guide elements 258 may have alternate configurations selected to help prevent dumping without departing from the spirit of the present invention.

Figure 4A:
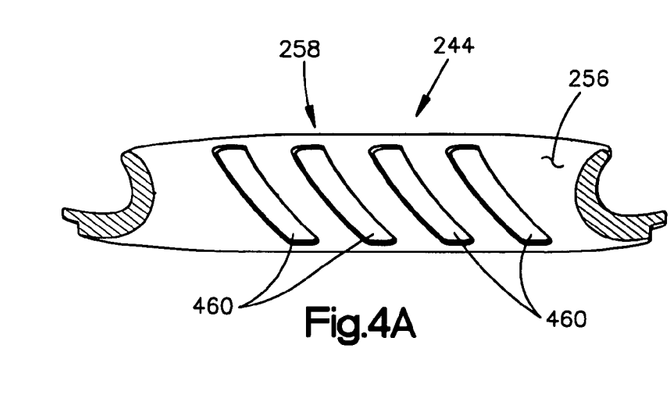
FIG. 4A is a sectional view taken generally along line 4-4 of FIG. 2 according to the first embodiment of the present invention.

In the embodiment of FIG. 4A, the guide elements 258 comprise grooves 460 stamped in the metal forming the guiding surface 256 of the guiding portion 244. The grooves 460 extend generally diagonally downward and to the right as viewed in FIG. 4A. This configuration is suited for installation on the driver side of the vehicle 108 because the torso portion 138 of the seatbelt webbing 112 will extend substantially parallel to or generally in the same direction as the grooves 460 when the seatbelt is extended about the occupant 104.

Figure 4B:
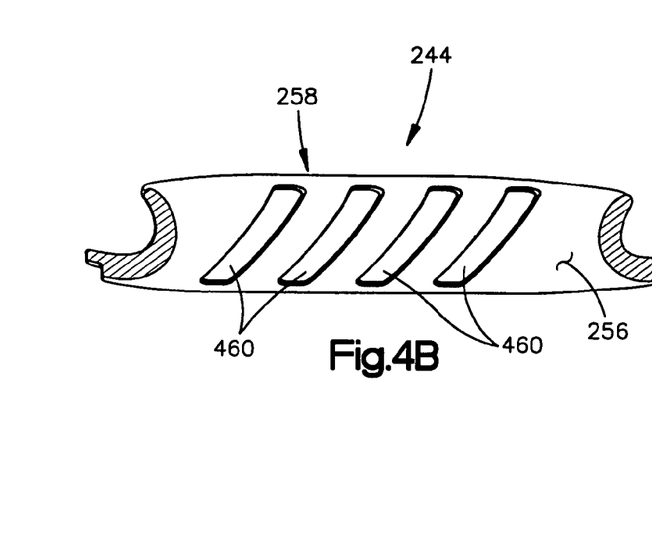
FIG. 4B is a sectional view taken generally along line 4-4 of FIG. 2 according to a second embodiment of the present invention.

In the embodiment of FIG. 4B, the guide elements 258 comprise grooves 460 stamped in the metal forming the guiding surface 256 of the guiding portion 244. The grooves 460 extend generally diagonally downward and to the left as viewed in FIG. 4B. This configuration is suited for installation on the passenger side 110 of the vehicle 108 because the torso portion 138 of the seatbelt webbing 112 will extend parallel to or generally in the same direction as the grooves 460 when the seatbelt is extended about the occupant 104.

Figure 4C:
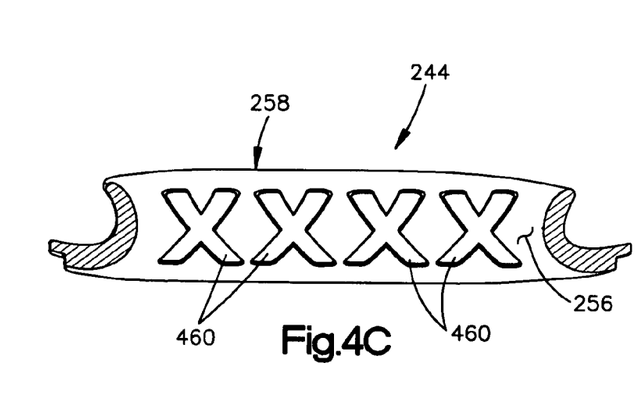
FIG. 4C is a sectional view taken generally along line 4-4 of FIG. 2 according to a third embodiment of the present invention.

In the embodiment of FIG. 4C, the guide elements 258 comprise grooves 460 stamped in the metal forming the guiding surface 256 of the guiding portion 244. The grooves 460 extend generally diagonally downward and to both the right and left as viewed in FIG. 4C, to form X-shapes on the guiding surface 256. This configuration is suited for installation on either the driver side or the passenger side 110 of the vehicle 108 because the torso portion 138 of the seatbelt webbing 112 will extend substantially parallel to or generally in the same direction as one portion of the X-shapes of the grooves 460 when the seatbelt is extended about the occupant 104.

Figure 4D:
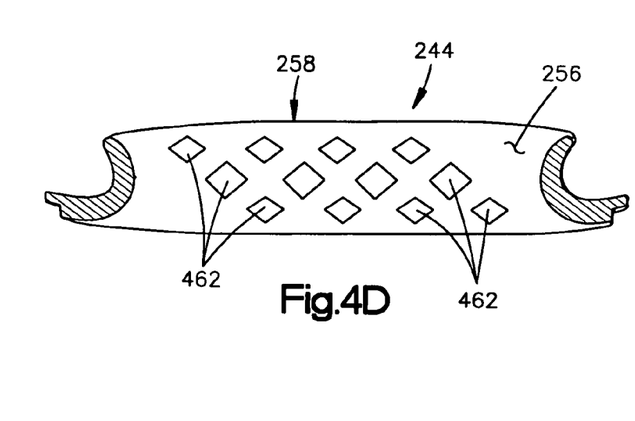
FIG. 4D is a sectional view taken generally along line 4-4 of FIG. 2 according to a fourth embodiment of the present invention.

In the embodiment of FIG. 4D, the guide elements 258 comprise studs 462 stamped in the metal forming the guiding surface 256 of the guiding portion 244. The studs 462 are scattered in an offset pattern along the guiding surface 256, as viewed in FIG. 4A. The studs 462 may be diamond-shaped as shown or have any other suitable shape or arrangement for helping prevent dumping as desired. This configuration is suited for installation on either the driver side or the passenger side 110 of the vehicle 108.

As shown in FIGS. 2-4D, the guiding surface 256 may have a curved or arcuate contour over which the seatbelt webbing 112 slides. Those skilled in the art will appreciate that the guide elements 258, being formed on the guiding surface 256, also share this arcuate contour. Thus, referring to FIG. 4A, for example, when the grooves 460 are described as extending generally downward and to the right, the grooves also extend along the arcuate contour of the guiding surface 256.

During use, the seatbelt webbing 112 may be subjected to high loads, such as when restraining an occupant 104 during the occurrence of a vehicle crash condition. When this occurs, the load applied tensions the seatbelt webbing 112 and applies a load to the guide 128. The guide 128 transfers the load to the vehicle structure (e.g., the B-pillar 126).

The guide 128 of the present invention is adapted to withstand high loads from the seatbelt webbing 112 while simultaneously helping to prevent dumping of the seatbelt webbing. The seatbelt webbing 112 is prevented from dumping by frictionally engaging with at least portions of the guide elements 258 as the seatbelt webbing 112 is tensioned and pulled into closer contact with the guiding surface 256. A portion of the seatbelt webbing 112 may also conform to the structure of the guide elements 258 under a sufficient amount of tension, which tends further to prevent the seatbelt webbing from sliding to one end of the webbing slot 248.

According to the present invention, a portion of the guiding surface 256 upon which the guide elements 258 are stamped, including at least one guide element, is positioned outside the mounting plane 352. In the illustrated embodiment, the entire guiding surface 256 is positioned outside the mounting plane 352, as shown in FIG. 3. The guiding surface 256 is positioned outside the mounting plane 352 by configuring the side portions 246 to extend at an angle from the mounting portion 242. Also shown in FIG. 3, there may be a clearance 364 between the mounting plane 352 and the guiding surface 256.

The desired separated relationship between the guiding surface 256 and the mounting plane 352 may be provided in a variety of manners. For instance, in the illustrated embodiment, the side portions 246 have predetermined lengths and extend from the mounting portion 242 at predetermined angles relative to the mounting plane 352. The predetermined lengths and angles are selected to position the guiding surface 256 outside the mounting plane 352.

The side portions 246 may extend at an angle from the mounting plane 238 with the angle being located at any desired position along the length of each side portion. For instance, bends forming the predetermined angles may be located where the side portions 246 meet the mounting portion 242, as is the case in the embodiment illustrated in FIG. 3. Alternatively, the bends may be formed in an intermediate area of the side portions 246 between the mounting portion 242 and the guiding portion 244 or near where the side portions meet the guiding portion.

Figure 5:
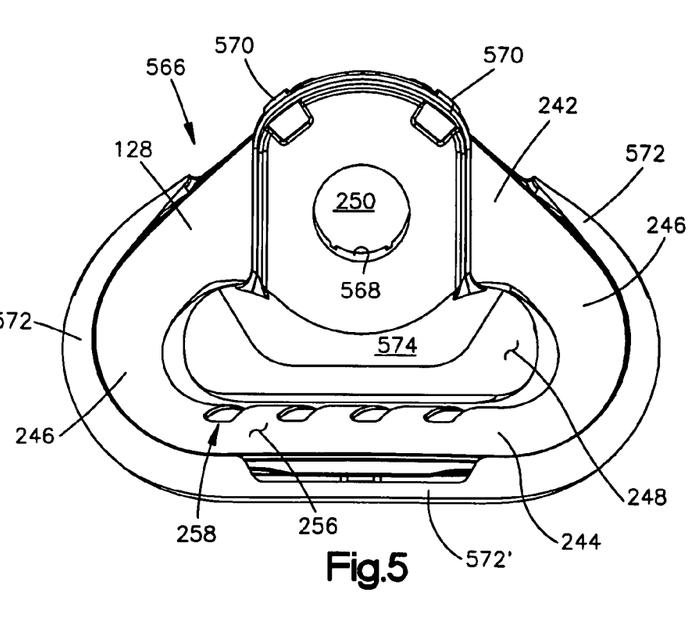
FIG. 5 is a front view of the portion of the apparatus of FIG. 2 assembled with a cover.

Referring to FIG. 5, the guide 128 may include a cover 566 connectable to the mounting portion 242, the guiding portion 244 or both. In the embodiment illustrated in FIG. 5, the cover 566 has first portions 568 that extend into the mounting hole 250, second portions 570 that extend over or around the mounting portion 242, and third portions 572 and 572' that extend around the side portions 246 and guiding portion 244, respectively, to help secure the cover 566 to the guide 128.

The cover 566 also includes a slot portion 574 that occupies a portion of the webbing slot 248. The slot portion 574 effectively reduces a height dimension of the webbing slot 248. This may, for example, help maintain the seatbelt webbing 112 in contact with the guiding surface 256 in a desired manner. This may also reduce the space into which the seatbelt webbing 112 may gather or bunch, which can help prevent dumping.

Figure 6:
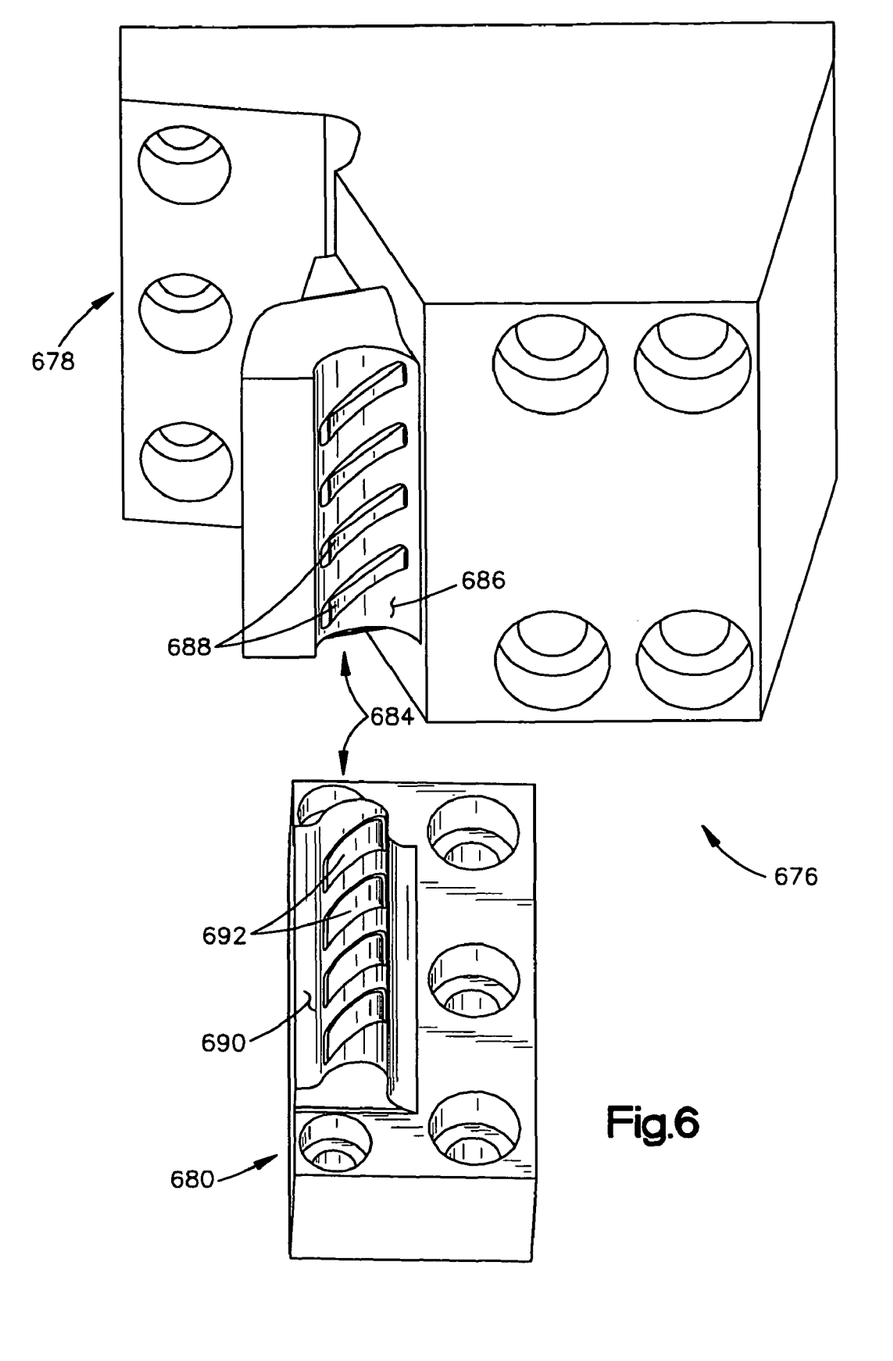
FIG. 6 is a perspective view illustrating tooling used to manufacture the portion of the apparatus shown in FIG. 2.

According to the present invention, the configuration of the guide 128 in which the guiding portion 244 and guiding surface 256 are positioned outside the mounting plane 352 facilitates forming the guiding portion, guiding surface, and thus the entire guide, with a one-piece stamped metal construction. FIG. 6 depicts a two-piece stamping die 676 used to stamp the guiding portion 244 and the guiding surface 256. The die 676 includes an upper die part 678 and a lower die part 680. The upper die part 678 is adapted to stamp the guide elements 258 on the guiding surface 256. The lower die part 680 is configured to support a lower surface 382 of the guiding portion 244, opposite the guiding surface 256 as shown in FIG. 3. Alternately, the stamping die 676 may be a single piece, similar or identical to the upper die part 678, adapted to stamp the guide elements 258 on the guiding surface 256. In this configuration, a structure (not shown), such as a solid block, anvil, jig, or worktop, would support the guiding portion 244 from the lower surface 382.

FIG. 6 is a perspective view depicting the working surfaces 684 of the upper die part 678 and lower die part 680 of the stamping die 676 shown in FIG. 6. The upper die part 678 has an upper die working surface 686, which includes one or more positive protrusions 688. The positive protrusions 688 of the upper die working surface 686 may be of any suitable shape to produce one or more guide elements 258 as desired. In the embodiment of FIG. 6, the positive protrusions 688 are elongated and angled across the upper die working surface 686. Each of the positive protrusions 688 of FIG. 6 has rounded ends and has a three-dimensional shape to follow the arcuate contour of the guiding surface 256. The area of the upper die working surface 686 other than the positive protrusions 688 may be shaped either to contact or avoid contacting the guiding surface 256.

The lower die part 680 has a lower die working surface 690, which includes one or more negative spaces 692. The negative spaces 692 of the lower die working surface 690 may be of any suitable shape to produce one or more guide elements 258 as desired. In the embodiment of FIG. 6, the negative spaces 692 are elongated and angled across the lower die working surface 690. The negative spaces 692 of FIG. 6 have rounded ends and are designed to cooperate with the positive protrusions 688 of the upper die working surface 686 to form the guide elements 258. The area of the lower die working surface 690 other than the negative spaces 692 may be shaped either to contact or avoid contacting the lower surface 382.

Figures 7A, 7B:
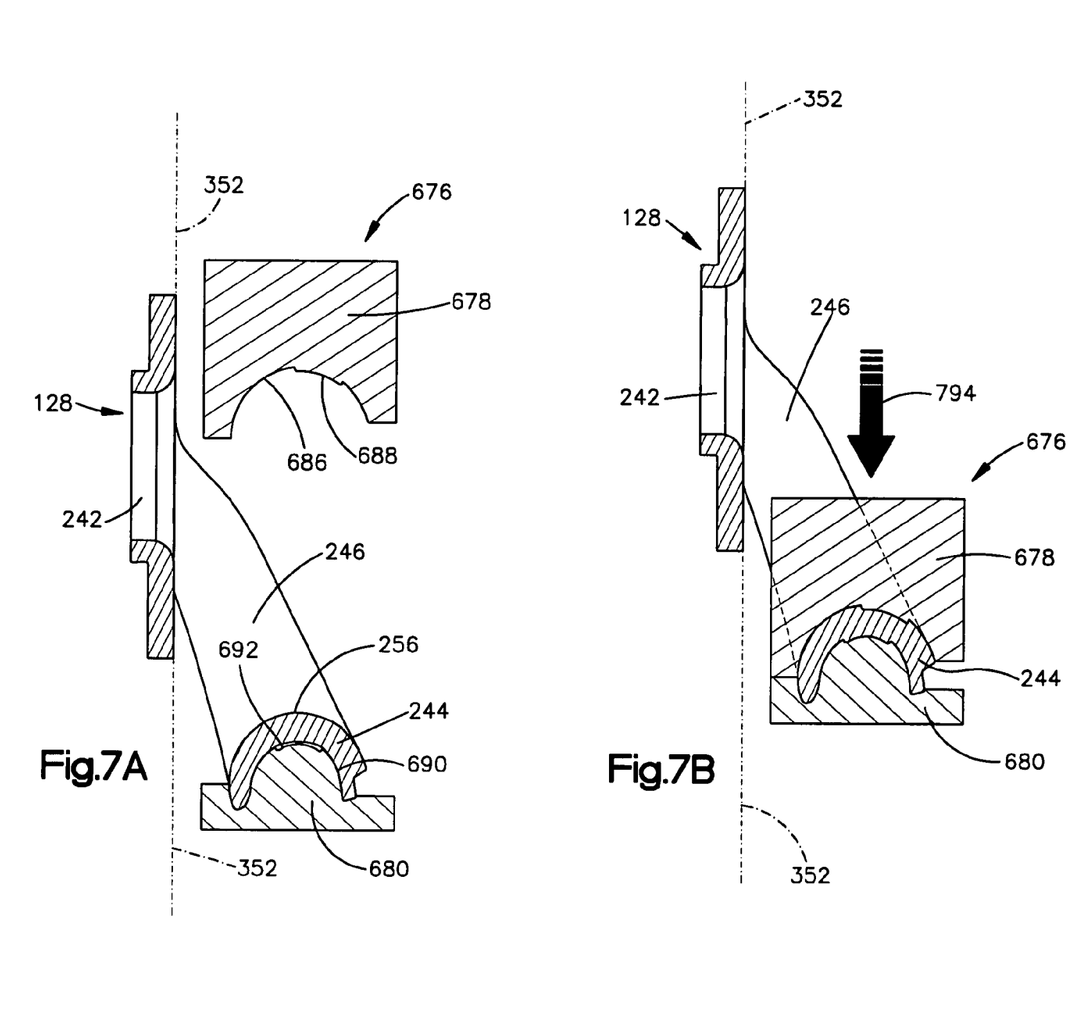
FIGS. 7A and 7B are sectional side views schematically illustrating the manufacture of the portion of the apparatus of FIG. 2.

To fabricate the guide 128, a guide blank (not shown) is stamped in a series of press operations to form the mounting portion 242, guiding portion 244, and side portions 246 as shown in the schematic view of FIG. 7A. At this stage of fabrication, the mounting portion 242, side portions 246, and guiding portion 244 are formed to position the guiding surface 256 outside the mounting plane 352 as described above. In this form, the guide elements 258 can be stamped on the guiding surface 256 using the stamping die 676 of FIGS. 6, 7A, or 7B or another suitable stamping die (not shown).

FIGS. 7A and 7B illustrate the process by which the two-piece stamping die 676 is used to stamp the guide elements 258 on the guiding surface 256. For clarity in describing the press operation of FIGS. 7A and 7B, this description assumes that the lower die part 680 remains stationary, the lower surface 382 of the guiding portion rests upon the lower die part, and the upper die part 678 moves relative to the lower die part. Those skilled in the art, however, will appreciate that one or both of the upper and lower die parts 678 and 680 may move relative to each other to perform the press operation.

As shown by the motion arrow 794, the upper die part 678 is moved along a path substantially parallel to the mounting plane 352 and into engagement with the guiding surface 256. "Substantially parallel" is used herein to indicate a relationship between the mounting plane 352 and at least one portion of the die 676 in which the mounting plane and die motion path remain spaced apart in a substantially equidistant relationship when viewed in cross-section at or near the guide 128 during the stamping operation. The motion arrow 794 path, if extended out, may ultimately cross the mounting plane 352 at a location spaced apart from the guide without destroying the substantially parallel aspect of the motion as described and claimed herein. Perfect equidistance between the mounting plane and motion arrow path at all locations in space is not required by this definition of "substantially parallel".

The motion of the stamping die 676 may be provided by a stamping press or other machinery capable of applying sufficient force to stamp the guide elements 258 in the guiding surface 256. The position of the guiding portion 244 outside the mounting plane 352 allows the upper die part 678 to move substantially parallel to the mounting plane and into engagement with the guiding portion to stamp the guide elements 258.

The sequence of manufacture depicted in FIGS. 8A, 8B, 8C, and 8D is performed using a two-piece stamping die 676 similar to that shown in FIG. 6 and is similar to the sequence shown schematically in FIGS. 7A and 7B. However, in the sequence of FIGS. 8A, 8B, 8c, and 8D, the upper die part 678 is initially engaged with the guiding surface 256 and held stationary relative to the guide 128 while the lower die part 680 is brought into engagement with the lower surface 382 of the guiding portion 244 to form the guide elements 258.

Figure 8A:
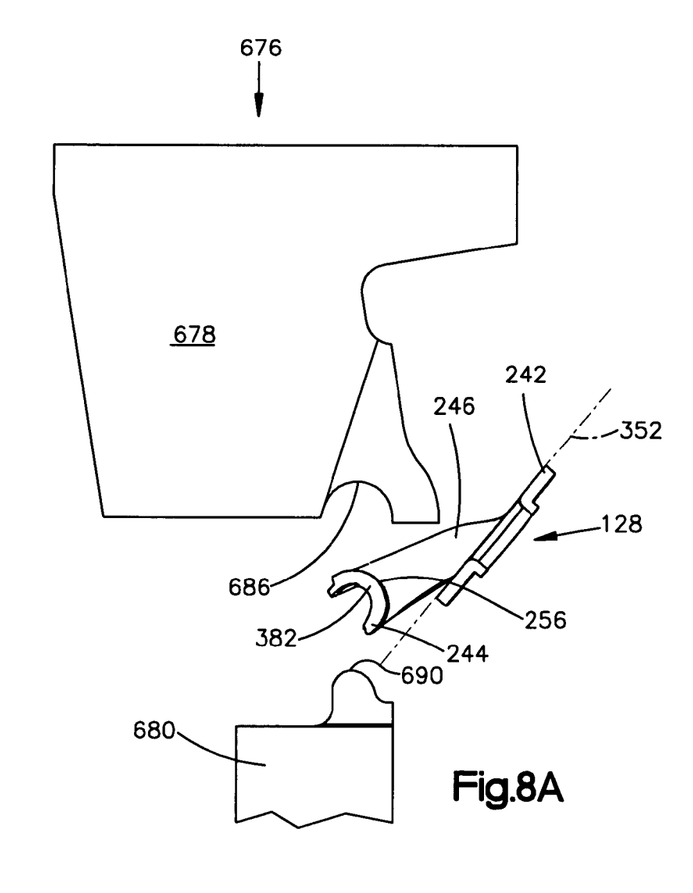
FIGS. 8A, 8B, 8C, and 8D are partial sectional side views illustrating the manufacture of the portion of the apparatus of FIG. 2.
Figure 8B:
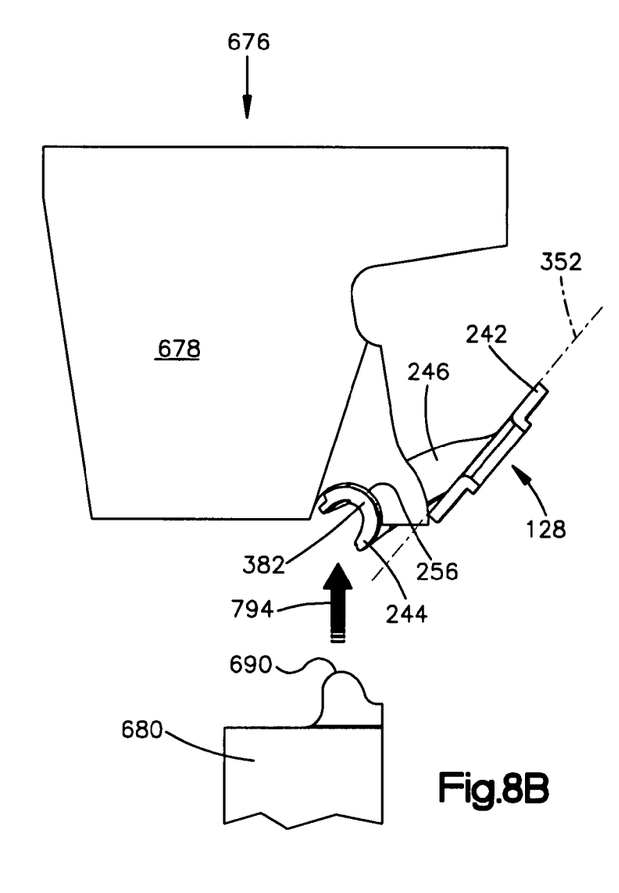

As shown in FIGS. 8A and 8B, the guide 128 may be brought into engagement with the upper die part 678 using a rotational motion if desired. There may be preliminary relative motion between the upper and lower die parts 678 and 680 in a direction that intersects the mounting plane 352 if the stamping die 676 is actuated while the guide 128 is still being seated on one of the upper and lower die parts during the manufacturing process. Nonetheless, such preliminarily intersecting motion will not destroy the substantially parallel nature of the stamping motion as long as the motion is substantially parallel, as defined above, just before and during stamping engagement of the upper and lower die parts 678 and 680 with the guiding portion 244.

Figure 8C:
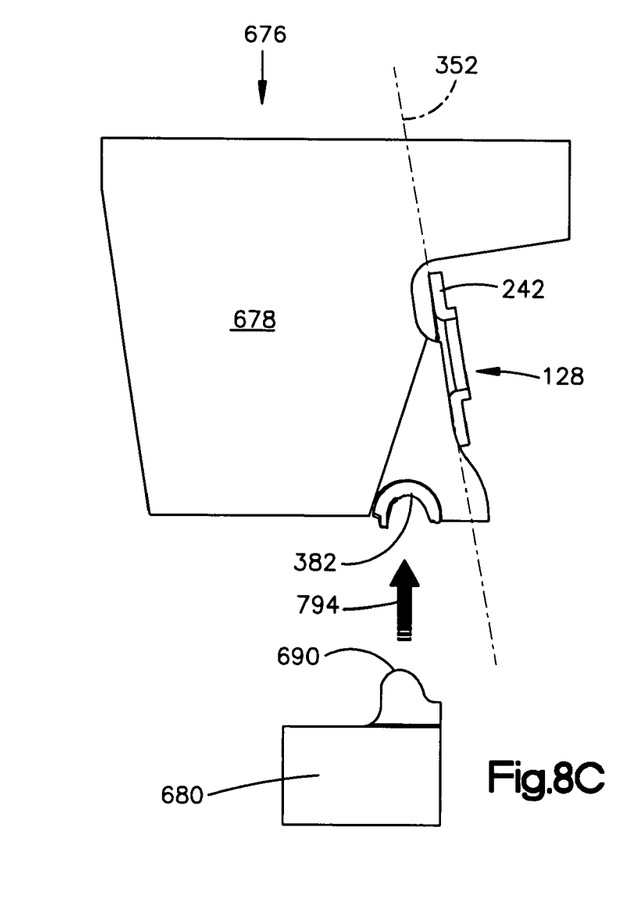
Figure 8D:
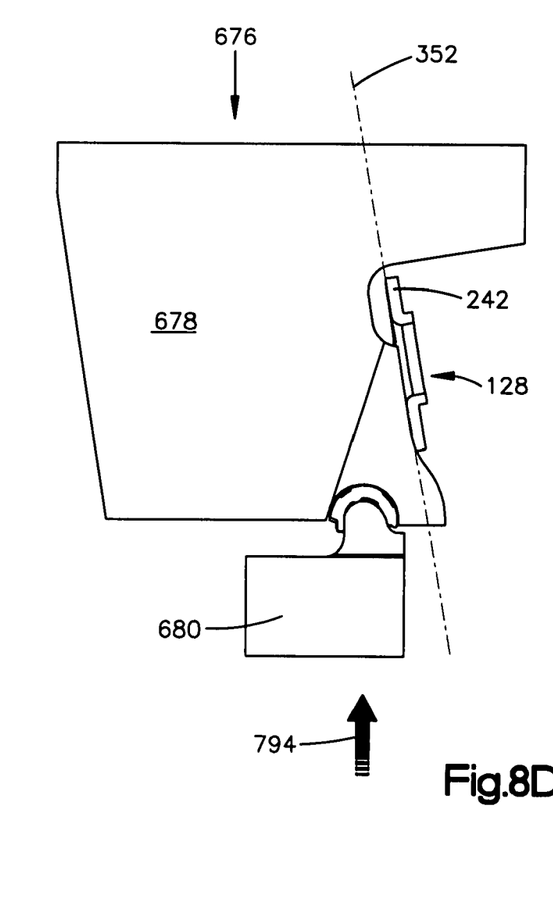

As shown in FIGS. 8C and 8D, the lower die part 680 may have a motion path which is not perfectly parallel to the mounting plane 352. Nonetheless, the motion shown in FIGS. 8C and 8D falls within the definition of "substantially parallel" described above.

Those skilled in the art will appreciate that the stamping die 676 may perform functions in addition to forming the guide elements 258. For example, the guiding portion 244 may have a generally flat cross-section when the stamping operation of FIGS. 8A and 8B is reached. In this case, the arcuate working surfaces 686 and 690 of the upper and lower die parts 678 and 680 may form the arcuate contour of the guiding surface 256 and the guide elements 258 in a single stamping operation.

Figure 9A:
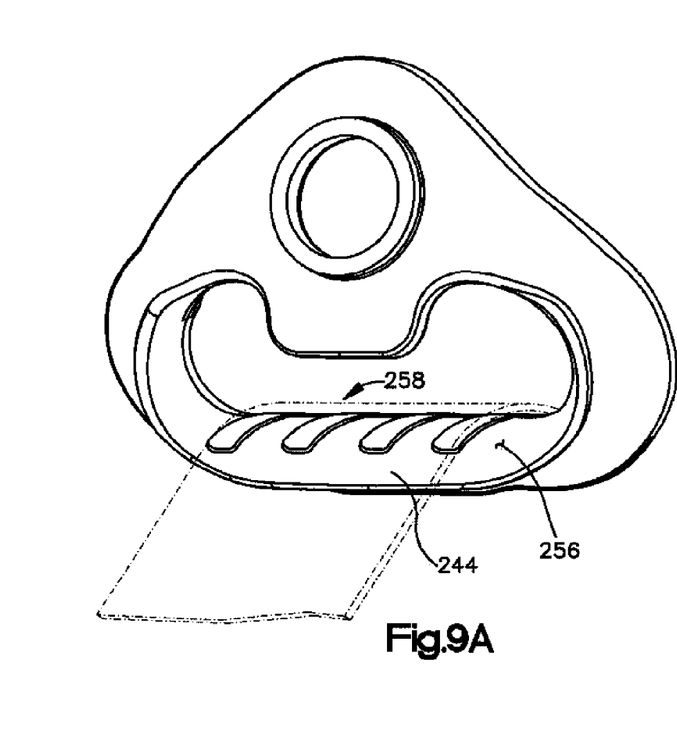
Figure 9B:
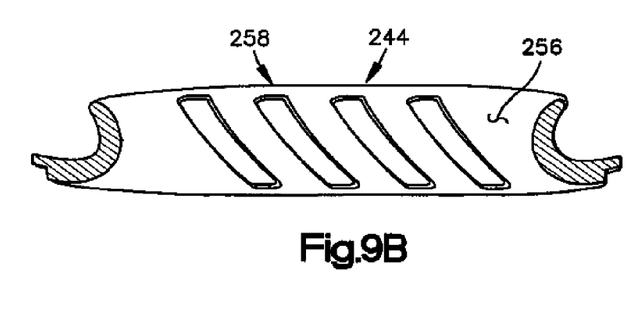
Figure 9C:
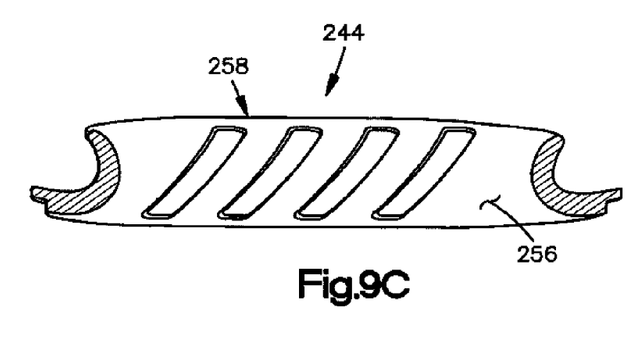
Figure 9D:
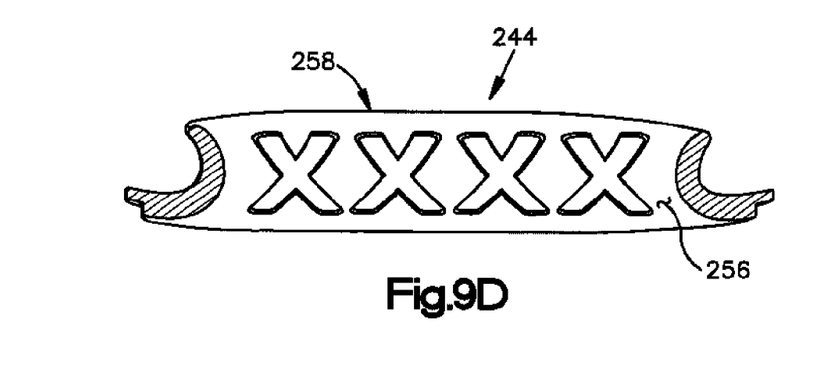
Figure 9E:
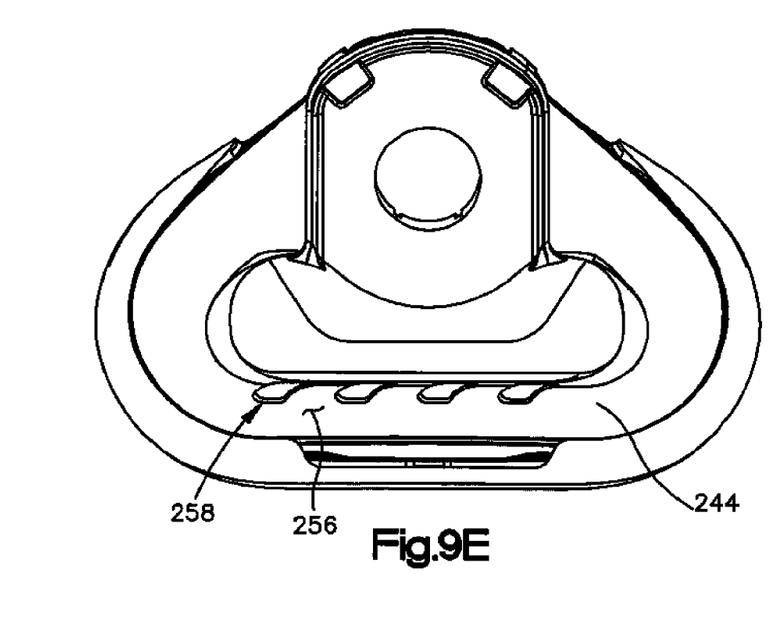

While aspects of the present invention have been particularly shown and described with reference to the illustrated embodiments above, those skilled in the art will appreciate that various additional features or embodiments may be contemplated without departing from the spirit and scope of the present invention. For example, the guiding portion 244 could be stamped such that the guide elements 258 protrude upward from the guiding surface 256 instead of being recessed into the guiding surface. This is shown in FIGS. 9A-9E.

From the above description of the invention, those skilled in the art will perceive improvements, changes and modifications in the invention. Such improvements, changes and modifications within the skill of the art are intended to be covered by the appended claims.

Having described the invention, the following is claimed:

1. A one-piece stamped metal guide for seatbelt webbing in a vehicle, the guide comprising:
    a mounting portion for mounting the guide in the vehicle, the mounting portion defining a mounting plane;
    a guiding portion including a guiding surface, the guiding surface comprising first and second guide elements stamped into the metal forming the guiding portion, the first guide element extending longitudinally in a first direction that is substantially parallel to the direction in which the seatbelt webbing extends along the guiding surface when extended about an occupant seated in the vehicle in a first position, the second guide element extending longitudinally in a second direction different from the first direction and substantially parallel to the direction in which the seatbelt webbing extends along the guiding surface when extended about an occupant seated in the vehicle in a second position, each of the first and second guide elements being one of recessed into the guiding surface and protruding upward from the guiding surface, a portion of the guiding surface including the first and second guide elements being positioned outside the mounting plane, the first and second guide elements being configured to help prevent dumping of the seatbelt webbing positioned on the guiding surface; and
    laterally spaced side portions connecting the guiding portion with the mounting portion, the mounting portion, guiding portion, and side portions defining a webbing slot for receiving the seatbelt webbing for sliding movement over the guiding surface.

2. The guide recited in claim 1, wherein the side portions have predetermined lengths and extend from the mounting portion at predetermined angles relative to the mounting plane, the predetermined lengths and angles being selected to position the portion of the guiding surface outside the mounting plane.

3. The guide recited in claim 1, wherein the position of the portion of the guiding surface outside the mounting plane is configured to allow a stamping die to move substantially parallel to the mounting plane and into engagement with the portion of the guiding surface to stamp the at least one guide element in the guiding surface.

4. The guide recited in claim 3, wherein the portion of the guiding surface outside the mounting plane is configured to allow a stamping die that includes an upper die part movable substantially parallel to the mounting plane into engagement with the guiding surface of the guiding portion and a lower die part positionable to support a lower surface of the guiding portion opposite the guiding surface.

5. The guide recited in claim 1, wherein the first and second elements comprise grooves.

6. The guide recited in claim 1, wherein the first and second guide elements are stamped in the guiding surface by a stamping die moving substantially parallel to the mounting plane.

7. The guide recited in claim 1, including a cover connectable to at least one of the mounting portion and the guiding portion, the cover including a slot portion that occupies a portion of the webbing slot, the cover effectively reducing a height dimension of the webbing slot.

8. The guide recited in claim 1, wherein the guiding surface has an arcuate contour.

9. The guide recited in claim 1, wherein the entire guiding surface is positioned outside the mounting plane.

10. The guide recited in claim 1, wherein the entire portion of the guiding surface comprising the first and second guide elements is positioned outside the mounting plane.

11. The guide recited in claim 1, wherein all of the first and second guide elements are positioned outside the mounting plane.

12. The guide recited in claim 1, wherein the guide is stamped from a single piece of homogeneous metal material.

13. The guide recited in claim 1 wherein the first and second guide elements are configured such that the seatbelt webbing conforms to the first and second guide elements under a predetermined amount of tension.

14. The guide recited in claim 1 wherein the seatbelt webbing is positioned on the guiding surface in the first position when the guide is mounted to the driver side of the vehicle and a seatbelt comprising the seatbelt webbing extends about an occupant in the driver side of the vehicle, the seatbelt webbing being positioned on the guiding surface in the second position when the guide is mounted to the passenger side of the vehicle and the seatbelt comprising the seatbelt webbing extends about an occupant in the passenger side of the vehicle.

15. The guide recited in claim 1 wherein said guiding portion is made of a high strength material.

16. An apparatus for helping to protect an occupant of seat in a vehicle, the apparatus comprising:
a length of seatbelt webbing having a first end portion and an opposite second end portion;
an anchor securing the first end portion of the seatbelt webbing to the vehicle;
a retractor securing the second end portion of the seatbelt webbing to the vehicle;
a stamped metal guide secured to the vehicle and defining a webbing slot through which the seatbelt webbing extends;
a tongue assembly secured to the seatbelt webbing between the first and second end portions; and
a buckle assembly secured to the vehicle for receiving the tongue assembly, the guide comprising:
a mounting portion for mounting the guide to the vehicle, the mounting portion defining a mounting plane;
a guiding portion including a guiding surface, the guiding surface comprising first and second guide elements stamped into the metal forming the guiding portion, the first guide element extending longitudinally in a first direction that is substantially parallel to the direction in which the seatbelt webbing extends along the guiding surface when extended about an occupant seated in the vehicle in a first position, the second guide element extending longitudinally in a second direction different from the first direction and substantially parallel to the direction in which the seatbelt webbing extends along the guiding surface when extended about an occupant seated in the vehicle in a second position, each of the first and second guide elements being one of recessed into the guiding surface and protruding upward from the guiding surface, a portion of the guiding surface including the first and second guide elements being positioned outside the mounting plane, the first and second guide elements being configured to help prevent dumping of the seatbelt webbing positioned on the guiding surface; and
laterally spaced side portions connecting the guiding portion with the mounting portion, the mounting portion, guiding portion, and side portions defining a webbing slot for receiving the seatbelt webbing for sliding movement over the guiding surface.

17. The guide recited in claim 16, wherein the entire guiding surface is positioned outside the mounting plane.

18. The guide recited in claim 16, wherein the entire portion of the guiding surface comprising the first and second guide elements is positioned outside the mounting plane.

19. The guide recited in claim 16, wherein all of the first and second guide elements are positioned outside the mounting plane.

20. The guide recited in claim 16 wherein the first and second guide elements are configured such that the seatbelt webbing conforms to the first and second guide elements under a predetermined amount of tension.

21. The guide recited in claim 16 wherein the seatbelt webbing is positioned on the guiding surface in the first position when the guide is mounted to the driver side of the vehicle and a seatbelt comprising the seatbelt webbing extends about an occupant in the vehicle, the seatbelt webbing being positioned on the guiding surface in the second position when the guide is mounted to the passenger side of the vehicle and the seatbelt comprising the seatbelt webbing extends about an occupant in the passenger side of the vehicle.

* * * * *